July 30, 1929.  J. B. HART  1,722,912
WHEEL BEARING FOR TRUCKS AND LIKE STRUCTURES
Filed Jan. 5, 1927
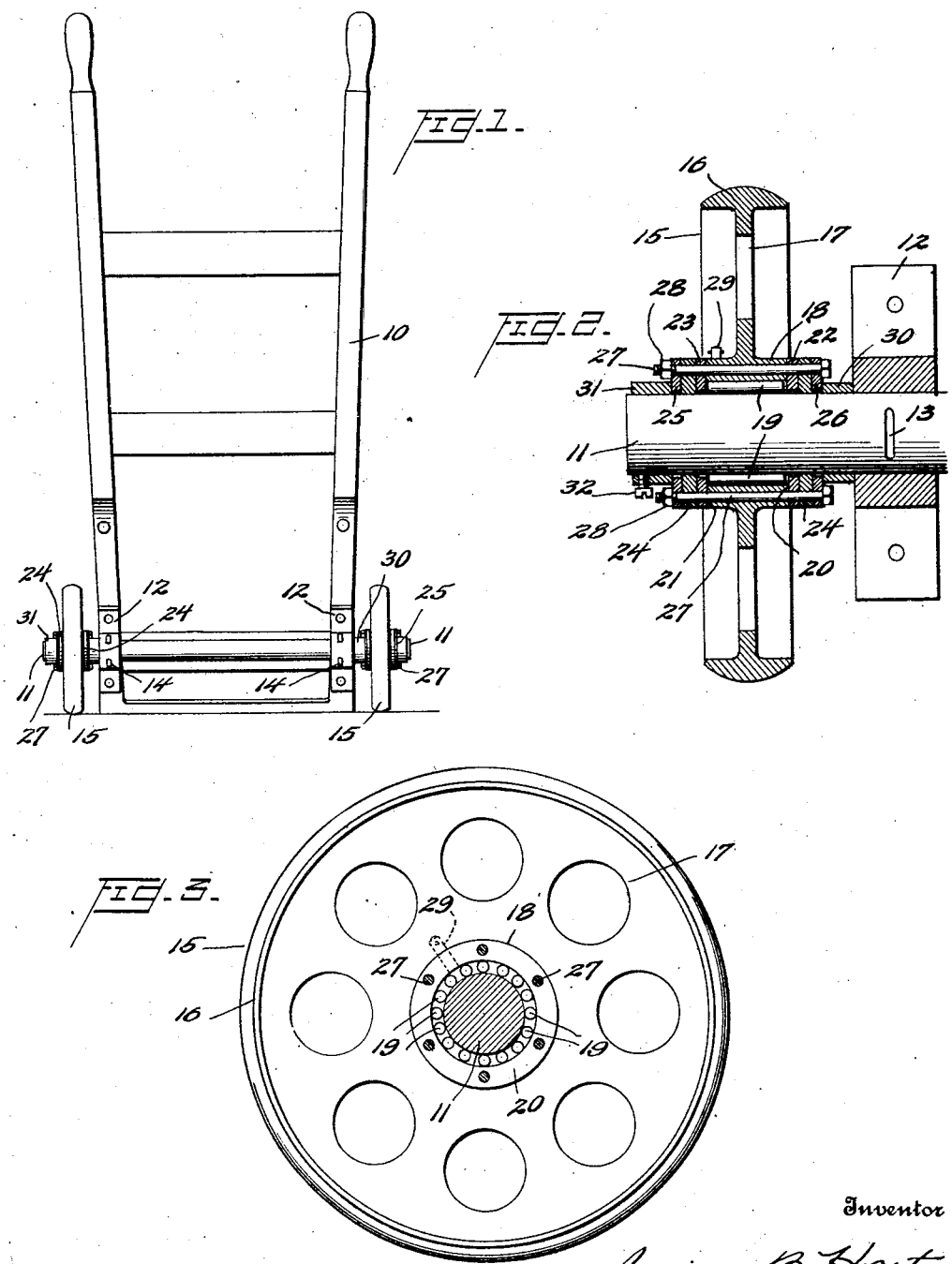
Inventor
Junius B. Hart,
By Watson, Coit, Morse + Grindle
Attorney Patented July 30, 1929.

1,722,912

UNITED STATES PATENT OFFICE.

JUNIUS B. HART, OF DOTHAN, ALABAMA.

WHEEL BEARING FOR TRUCKS AND LIKE STRUCTURES.

Application filed January 5, 1927. Serial No. 159,180.

This invention relates to warehouse and platform trucks and other wheeled structures and particularly to the support bearings thereof.

The principal object of this invention is to provide a wheel support bearing for a platform truck which will have little frictional resistance to turning.

Another object is to provide a bearing which will retain lubricant for a great length of time without refilling but which may be readily refilled when necessary.

The principal novel feature of this invention is the simple, easily assembled and inexpensive structure provided for accomplishing the above objects.

Other objects and features will be apparent from the description and drawings, in which:

Figure 1 is an assembly view of a truck seen from below;

Figure 2 is an enlarged section through the weel and bearing; and

Figure 3 is a section taken on the line 3—3 of Fig. 2.

Referring to the drawings, 10 designates the frame of a platform truck, here shown as a tilting truck, carrying the load upon a single journal bar having stub axles 11 at each end projecting beyond the sides of the truck frame. The invention is not limited to the type of vehicle shown but may be used with other structures, such as four-wheel trucks.

In the present instance the journal bar is fixed against axial or rotative movement with respect to the truck frame. The bar is round and is mounted in openings in brackets 12 on the truck frame. The bar is notched on one side as at 13, and a pin 14 (Fig. 1) is inserted through the bracket so as to seat in this notch.

A wheel 15 is mounted upon each axle 11. This wheel has a rim 16 which may be rounded upon its tread to shed accumulations of mud or like gummy substances collecting thereon. A web 17 secures the rim to a hub 18. Rollers 19 may be placed between the axle and hub to reduce friction therebetween. These rollers are of the same length, with a small clearance at each end, as the hub. The hub is faced at its ends 20, 21 to provide a lubricant tight joint with hub plates 22, 23 which closely fit the shaft and hold the rollers in working position. A grease gasket 24 of felt or other suitable material is fitted tightly about the axle outside each of the hub plates, and gasket plates 25, 26, which in structure may be identical with the hub plates, are used to hold the gaskets securely in position against the hub plates. Bolts 27 secured in or passing through the hub or web of the wheel and through suitable holes in the plates together with nuts 28, hold the hub plates tightly against the hub faces and also hold the packing or gaskets between the hub plates and gasket plates. Obviously when the gasket is made of felt or like material it will be squeezed against the axle when the plates are pulled together, so in the event that the gasket becomes enlarged about the axle due to wear, it is only necessary to draw up the nuts on the bolts and draw the plates together in order to force the gasket about the shaft again.

This structure will retain the rollers and lubricant within the hub of the wheel no matter what the position of the wheel along the shaft may be. A fitting 29 may be provided for supplying lubricant to the bearing. As illustrated, a washer 30 holds the wheel at a fixed distance from the brackets, while a collar 31 fits upon the axle at its outer end to retain the wheel. It will be obvious that the washer or collars 30 may be cast integral with the brackets 12. A set screw 32 serves to hold the collar in adjusted position against the outer gasket plate.

It is to be understood that the invention is not limited to the exact embodiment illustrated, but may assume various other embodiments within the scope of the appended claim.

Having thus described the invention, what is claimed as new and desired to be secured by Letters Patent is:

A bearing for truck wheels comprising, in combination, a non-rotating axle, a wheel having its hub rotatably mounted thereon, means on the axle to prevent axial movement of the wheel, rollers between the hub and axle, a pair of relatively movable axially spaced plates at each end of the hub closely fitting about the axle, a grease gasket disposed between each pair of plates, and bolts extending into the hub and through all of the plates for securing the plates and wheel together and to retain the rollers and lubricant within the hub, said bolts constituting means to take up wear in the gaskets.

In testimony whereof I hereunto affix my signature.

JUNIUS B. HART.